United States Patent Office 3,574,096
Patented Apr. 6, 1971

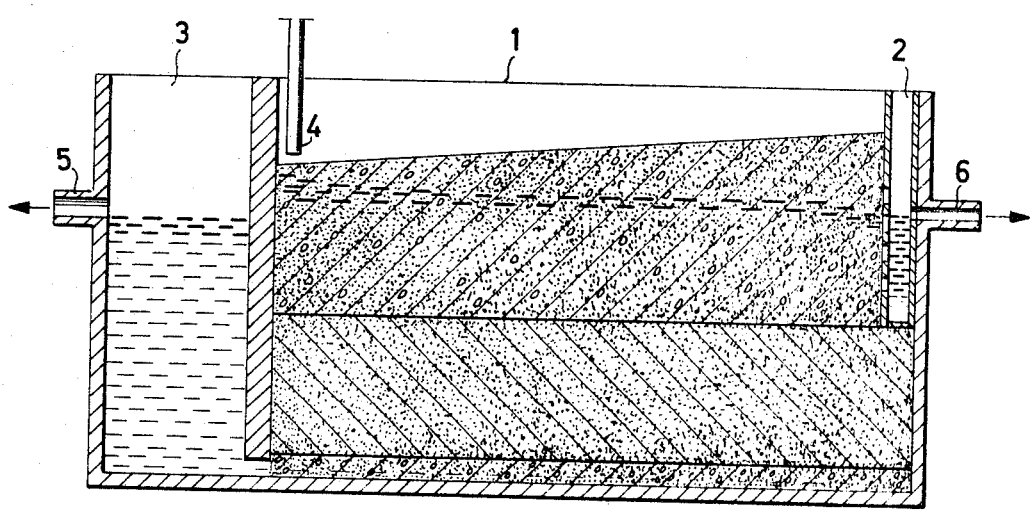

3,574,096
PROCESS AND APPARATUS FOR THE SEPARATION OF OIL FROM AN OIL-WATER MIXTURE
Bo R. Carlstedt, Grastigen 1, Saltsjobaden, Sweden
Filed Mar. 24, 1969, Ser. No. 809,907
Claims priority, application Sweden, Apr. 8, 1968,
4,722/68
Int. Cl. B01d *17/04*
U.S. Cl. 210—23          5 Claims

ABSTRACT OF THE DISCLOSURE

A process and an apparatus for the separation of oil from an oil-water mixture comprising introducing an oil-water mixture to a surface region of a layer of grainy oil-resistant material housed in a tank, flowing an aqueous phase substantially vertically down through the layer of said material, maintaining a ground water zero-pressure level in said layer and finally collecting a substantially pure oil phase at a place in said layer situated at a distance from the region where the mixture has been introduced.

---

The present invention is concerned with a simple process for efficient separation of oil from an oil-water mixture and relates also to a simple apparatus by means of which the process may be carried out.

Oils, especially from petroleum products, have acquired an increasingly wide-spread use in modern society. The oil consumption has however certain negative effects occurring when oil is released due to spilling, leaking, overfilling, traffic accidents etc. This may cause the oil to flow down into the soil and mix with the subsoil water, or to flow out into lakes or other water courses or to sewage-treating stations, and in all these cases it will mix with the water. Measures taken to prevent spreading of the oil involves inter alia that the oil is collected in the form of an oil-water mixture. The elimination of this oil-water mixture presently constitutes a big problem due to the large amounts of water that accompany the oil in the cleaning operations.

Moreover, efficient oil separators are necessary equipment in places where oil is handled and spilled in close proximity of water, for example in harbours, gasoline stations, etc.

By means of field tests it has now been found that oil penetrates into the soil to the capillary zone above the ground water level, where it spreads laterally. If in a place close to oil on the ground or in a superficial soil layer a hole is dug down to the ground water level, oil will move to this hole due to the so-called capillary gradient that is established towards the hole.

The process according to this invention is based on these tests and is characterized substantially by introducing the oil-water mixture from above to a surface region of the layer of grainy oil-resistant material housed in a tank, flowing the aqueous phase substantially vertically down through the layer of said material, while the oil phase spreads substantially laterally in said layer, maintaining a ground water zero-pressure level in said layer in or below the zone where the lateral spreading of the oil phase occurs, and finally collecting the substantially pure oil phase at the place in the layer situated at a distance from the zone where the mixture has been introduced.

Preferably the stream or flow of the oil-water mixture as introduced is maintained as small and uniform as possible, whereby a very quiescent and continuous separation is attained.

The term "grainy oil-resistant material" is meant to comprise not only natural materials, such as gravel or sand, but also synthetic materials, such as different plastics in the form of grain, fine or coarse particles etc. The layer of this material may consist of different superposed strata of materials. Within each such stratum the grains or particles should have substantially the same size.

In addition to giving an extremely good separation the process of this invention liberates the oil from impurities, which are filtered off during the lateral movement of the oil phase.

The apparatus that is suitable and convenient for carrying out the aforesaid process is characterized substantially by a tank containing a bed of grainy oil-resistant material, a water storage basin at the bottom of the tank, the basin communicating with the interior of the tank and having an overflow for controlling and adjusting a ground water level in the tank, and an oil trap inserted in the layer of grainy material, the oil trap having a perforated or slotted side wall in contact with the layer and having an overflow which is adapted to allow oil from the trap to pass out of the tank and is positioned at a level higher than the water overflow of the basin, the apparatus moreover comprising a conduit for supplying an oil-water mixture to the bed in a surface region thereof at a distance from the oil trap and preferably close to a tank wall remote from the oil trap. This oil trap may be, for example, a well, receptacle or hole, or may be a tube, pipe, channel or groove.

The oil-water mixtures to be separated are often formed discontinuously and will thus arrive at irregular intervals. For optimum utilization of the capacity of an apparatus according to this invention, the apparatus may additionally comprise a surge vessel provided with small tap holes and arranged in the supply conduit. Such a surge vessel arrangement will efficiently contribute to ensure a continuous and quiescent flow of the oil-water mixture to the grainy material in the tank.

According to one embodiment of the apparatus the bed consists of an upper stratum of gravel, an intermediate stratum of sand and a bottom stratum of gravel. The upper surface of the bed is suitably somewhat sloping down towards the region, where the oil-water mixture is introduced.

The invention will be further illustrated with reference to the drawing which shows one embodiment of the apparatus according to the invention.

The figure of the drawing shows a cross-section of an elongated tank 1 containing a bed which consists of an upper stratum of gravel, an intermediate stratum of sand, and a thin bottom stratum of gravel. The bottom stratum is drained by communication with a water-collecting basin or well 3 having an overflow 5. At one of the longitudinal sides of the tank close to the tank wall an oil-collecting channel 2 is arranged in the upper gravel stratum. This channel has a wall in contact with the gravel layer and provided with vertical slots, and moreover has an overflow 6 at a level somewhat higher than the level of the water overflow 5.

The apparatus is operated in the following way: The oil-water mixture to be separated is introduced into the surface of the bed through the conduti 4, the flow of the mixture being maintained calm and continuous so as to prevent this oil-water mixture from spreading too much laterally. The bed surface, therefore, is somewhat inclined down towards the region where the mixture is introduced. In the capillary zone in the gravel stratum above the ground water level the oil phase then spreads laterally towards the oil-collecting channel, while the aqueous phase is flowing straight through the gravel-sand-gravel strata and is finally discharged via the overflow 5. The height of the ground-water level as defined by the overflow 5 is determined mainly by the oil-water mixture added and by the flow-resistance of the water in the gravel and sand strata. Oil that has now moved laterally towards the oil-collecting channel will enter the channel through the vertical slots and collect on the liquid surface in the channel, to thus form a layer increasing in thickness. When the top of the oil layer reaches the overflow 6, oil will flow over into a separate collecting vessel (not shown).

Laboratory tests for demonstrating the oil-separating effect have been performed with an apparatus of this type where the bed had a surface of 200 sq. cm. (5×40 cm.) and consisted of one 35 cm. top stratum of gravel (grain size 3–8 mm.), one 30 cm. intermediate stratum of sand (grain size 0.5–1 mm.) and one 5 cm. bottom stratum of the same gravel as in the upper stratum. The difference in height between the oil overflow and water overflow was 2–4 cm. The oil-water mixture that was tested had a content of 37.5 cc. of coloured fuel oil per litre of water. Samples of the discharged water which were taken after testing through the water storage basin of water volume corresponding to 3–5 times the volume of the basin showed a content of 20 mg. of fuel oil in dissolved state per liter of water, i.e., a separation of 99.95% of the oil from the water had been achieved. In this connection it should also be pointed out that the fuel oil employed in these test-runs had a maximum solubility in water amounting to 25 mg./litre.

The invention is not restricted to the specific features of the above described apparatus. The tank may for instance have a circular shape with a circular oil-collecting well in its center, and in that case spreader nozzles may be arranged at the end of the supplying conduit so as to spread the oil-water mixture along the whole periphery of the tank.

I claim:

Although the invention has been described and illustrated in detail, it is to be understood that this does not delimit the invention. The spirit and scope of this invention is limited only to the language of the appended claims.

1. An apparatus for the separation of oil from an oil-water mixture comprising a tank containing a bed with an upper gravel stratum, an intermediate sand stratum and a bottom gravel stratum; a water storage basin at the bottom of the tank, said basin communicating with the interior of the tank and having an overflow for controlling and adjusting a ground water level in the tank; an oil trap positioned in the bed, said oil trap having a perforated or slotted sidewall in contact with said bed and having an overflow which is adapted to allow oil from said trap to pass out of said tank and is positioned at a level higher than the water overflow of said basin; and a conduit for supplying an oil-water mixture to the bed in a surface region thereof at a distance from said oil trap.

2. An apparatus as claimed in claim 1 wherein said conduit is adapted to supply said oil-water mixture to the bed close to a tank wall remote from said oil trap, and the upper surface of said bed is somewhat sloping down towards the region where said oil-water mixture is introduced.

3. An apparatus as claimed in claim 1 wherein the sidewall of said oil trap is in contact with said upper gravel stratum.

4. A process for the separation of oil from an oil-water mixture comprising the steps of introducing from above an oil-water mixture to a surface region of a layer of grainy oil-resistant material housed in a tank; flowing said mixture substantially vertically down to a zone below said surface region but still in the upper part of said layer; flowing the aqueous phase from said zone substantially vertically downwardly and the oil phase substantially horizontally through said layer while maintaining the zero-pressure level of the water in said layer below said zone; and finally collecting substantially pure oil phase in an oil trap positioned laterally of said layer at a level below the surface of said layer.

5. An apparatus for the separation of oil from an oil-water mixture, comprising a tank containing a bed of grainy oil-resistant material; a substantially vertical water-impermeable wall extending laterally said bed; a water storage basin communicating with said tank via a duct at the lowermost end of said vertical water-impermeable wall, said basin contains a body of water which maintains, via said duct, a zero-pressure level of the water in said bed below the upper surface of said bed and has a water overflow at a level below the upper surface of said bed for controlling and adjusting said zero-pressure level; a conduit for supplying from above an oil-water mixture to a surface region of said bed; and an oil trap positioned laterally said bed and having a perforated or slotted side wall in contact with said bed, and having an oil overflow positioned at a level higher than said overflow of said water storage basin but below the level of the upper surface of said bed.

References Cited

UNITED STATES PATENTS

| | | | |
|---|---|---|---|
| 537,705 | 4/1895 | McCabe | 210—290X |
| 1,159,044 | 11/1915 | Kelly, Jr. | 210—537X |
| 1,979,197 | 10/1934 | Harf | 210—291X |
| 2,405,838 | 8/1946 | Lawson et al. | |
| 2,785,123 | 3/1957 | Stroud | 210—40X |
| 3,179,603 | 4/1965 | Edwards et al. | 210—23X |
| 1,992,420 | 2/1935 | Gleason et al. | 210—265 |

FOREIGN PATENTS

| | | | |
|---|---|---|---|
| 458,342 | 10/1913 | France | 210—291 |

JOHN ADEE, Primary Examiner

U.S. Cl. X.R.

210—84, 265, 290